United States Patent [19]
Nishimura

[11] Patent Number: 5,715,495
[45] Date of Patent: Feb. 3, 1998

[54] APPARATUS HAVING A LOCKING MECHANISM FOR CARTRIDGE CHAMBER LID

[75] Inventor: Tomoki Nishimura, Kawasaki, Japan

[73] Assignee: Nikon Corporation, Tokyo, Japan

[21] Appl. No.: 663,370

[22] Filed: Jun. 13, 1996

[30] Foreign Application Priority Data

Jun. 15, 1995 [JP] Japan ................. 7-148846
Aug. 25, 1995 [JP] Japan ................. 7-217717

[51] Int. Cl.⁶ .................... G03B 17/02; G03B 17/26
[52] U.S. Cl. ................................ 396/538; 396/513
[58] Field of Search ........................... 396/536, 538, 396/513, 514

[56] References Cited

U.S. PATENT DOCUMENTS

| 5,481,325 | 1/1996 | Wada et al. ................ 354/173.1 |
| 5,500,705 | 3/1996 | Stephenson, III .............. 354/288 |
| 5,506,650 | 4/1996 | Stephenson, III et al. ...... 354/275 |
| 5,550,608 | 8/1996 | Smart et al. .................... 354/174 |
| 5,563,672 | 10/1996 | Fuss et al. ..................... 396/538 |
| 5,565,951 | 10/1996 | Tokui .............................. 396/538 |
| 5,587,757 | 12/1996 | Seamans et al. ................ 396/536 |
| 5,592,253 | 1/1997 | Nishimura et al. ............. 396/538 |
| 5,600,393 | 2/1997 | Funahashi ....................... 396/513 |
| 5,630,192 | 5/1997 | Kobayashi ....................... 396/513 |

FOREIGN PATENT DOCUMENTS

| 60-37537 | 2/1985 | Japan . |
| 62-173449 | 7/1987 | Japan . |
| 5-150342 | 6/1993 | Japan . |
| 7-56219 | 3/1995 | Japan . |
| 7-128716 | 5/1995 | Japan . |
| 7-319024 | 12/1995 | Japan . |

OTHER PUBLICATIONS

English–language abstract of JP 60-37537.
English–language abstract of JP 62-173449.
English–language abstract of JP 5-150342.
English–language abstract of JP 7-56219.
English–language abstract of JP 7-128716.
English–language abstract of JP 7-319024.

*Primary Examiner*—Safet Metjahic
*Assistant Examiner*—John Chizmar
*Attorney, Agent, or Firm*—Oliff & Berridge P.L.C.

[57] ABSTRACT

An apparatus that can be loaded with a film cartridge provided with a light-blocking door for opening and closing a film intake/outlet slot, comprises an opening/closing mechanism that opens and closes the light-blocking door, a cartridge chamber where the film cartridge is housed, a cartridge chamber lid that opens and closes a cartridge insertion access of the cartridge chamber, an operating device that is capable of moving between a non-allowing position at which opening of the cartridge chamber lid is prevented and an allowing position at which opening of the cartridge chamber lid is allowed, and a locking mechanism that becomes displaced to a state in which the operating device is prevented from moving to the allowing position and to a state in which the operating device is free to move to the allowing position, with an operation of the opening/closing mechanism.

10 Claims, 9 Drawing Sheets

B ←→ A

APPARATUS HAVING A LOCKING MECHANISM FOR CARTRIDGE CHAMBER LID

BACKGROUND OF THE INVENTION

1. Field of the Invention

The present invention relates to an apparatus such as a camera, that is provided with a cartridge chamber into which a film cartridge may be loaded and a cartridge chamber lid for opening and closing the cartridge chamber and is capable of preventing the cartridge chamber lid from opening inadvertently.

2. Description of the Related Art

Japanese laid-open patent application No.5-150342 discloses a camera with a cartridge chamber formed at one end. A cartridge insertion access opens at the bottom surface of the camera and a film cartridge is loaded into the cartridge chamber in the direction of its major axis via the cartridge insertion access. In addition, a swinging type cartridge chamber lid for opening and closing the cartridge insertion access is provided at the bottom surface of the camera and when the cartridge chamber lid is closed after loading a cartridge, film feed from the cartridge starts.

However, if the cartridge chamber lid is inadvertently opened while the film is drawn out from the cartridge, the film may be accidentally exposed.

SUMMARY OF THE INVENTION

An object of the present invention is to provide an apparatus with a cartridge chamber lid locking mechanism that is capable of preventing undesired exposure of film.

In order to achieve the object described above, the apparatus according to the present invention, into which a film cartridge provided with a light-blocking door for opening and closing a film intake and outlet slot may be loaded, comprises a switching mechanism that opens and closes the light-blocking door, a cartridge chamber where the film cartridge is housed, a cartridge chamber lid for opening and closing the cartridge insertion access of the cartridge chamber, an operating device that is capable of moving between a preventing position at which the cartridge chamber lid is prevented from opening, and an open allowing position at which the cartridge chamber lid is allowed to open, and a locking mechanism which, with the operation of the switching mechanism, becomes displaced to a state in which the operating device is prevented from moving to the allowing position and to a state in which the operating device is free to move to the open-allowing position.

According to the present invention, the locking mechanism becomes displaced to a states in which the operating device is prevented from moving to the open-allowing position and in which the operating device is free to move to the open-allowing position, with the operation of the switching mechanism which performs open and close drive for the light-blocking door of the cartridge. Since the locking mechanism interlocks with the opening and closing of the light-blocking door of the cartridge in this manner, a problem such as the cartridge chamber lid becoming inadvertently opened while film is drawn out from the cartridge can be prevented.

An apparatus according to another aspect of the present invention comprises the cartridge chamber, the cartridge chamber lid and the operating device described above and a locking mechanism that is capable of becoming displaced to states in which the operating device is prevented from moving to the open-allowing position and in which the operating device is free to move to the open-allowing position. The locking mechanism is provided with a rotating rod that can receive torque at one end thereof, and a movement-preventing member that alternatively prevents and allows the movement of the operating device to the open-allowing position, with the rotation of the rotating rod. The rotating rod is constituted of an elastic member approximately the same length as the cartridge chamber along its major axis, extends in a direction approximately parallel to the direction of the major axis of the cartridge chamber and becomes torsionally deformed when a torque at or above a specific value is applied to one end while rotation of the rod is being prevented at the other end.

According to this aspect of the present invention, the locking mechanism interlocks with the open and closed states of the light-blocking door of the cartridge as in the case described above. Although the rotating rod, which is a component of the locking mechanism, receives torque at one end, it may be prevented from rotating at the other end depending upon the position of the operating device. Since the rotating rod is constituted of an elastic member that is capable of being torsionally deformed, the torque is absorbed by the deformation of the rotating rod in the case described above so that damage to the rotating rod itself or to other members is prevented.

DETAILED DESCRIPTION OF THE PREFERRED EMBODIMENTS

First Embodiment

The first embodiment according to the present invention is explained in reference to FIGS. 1–5.

Figure 1:
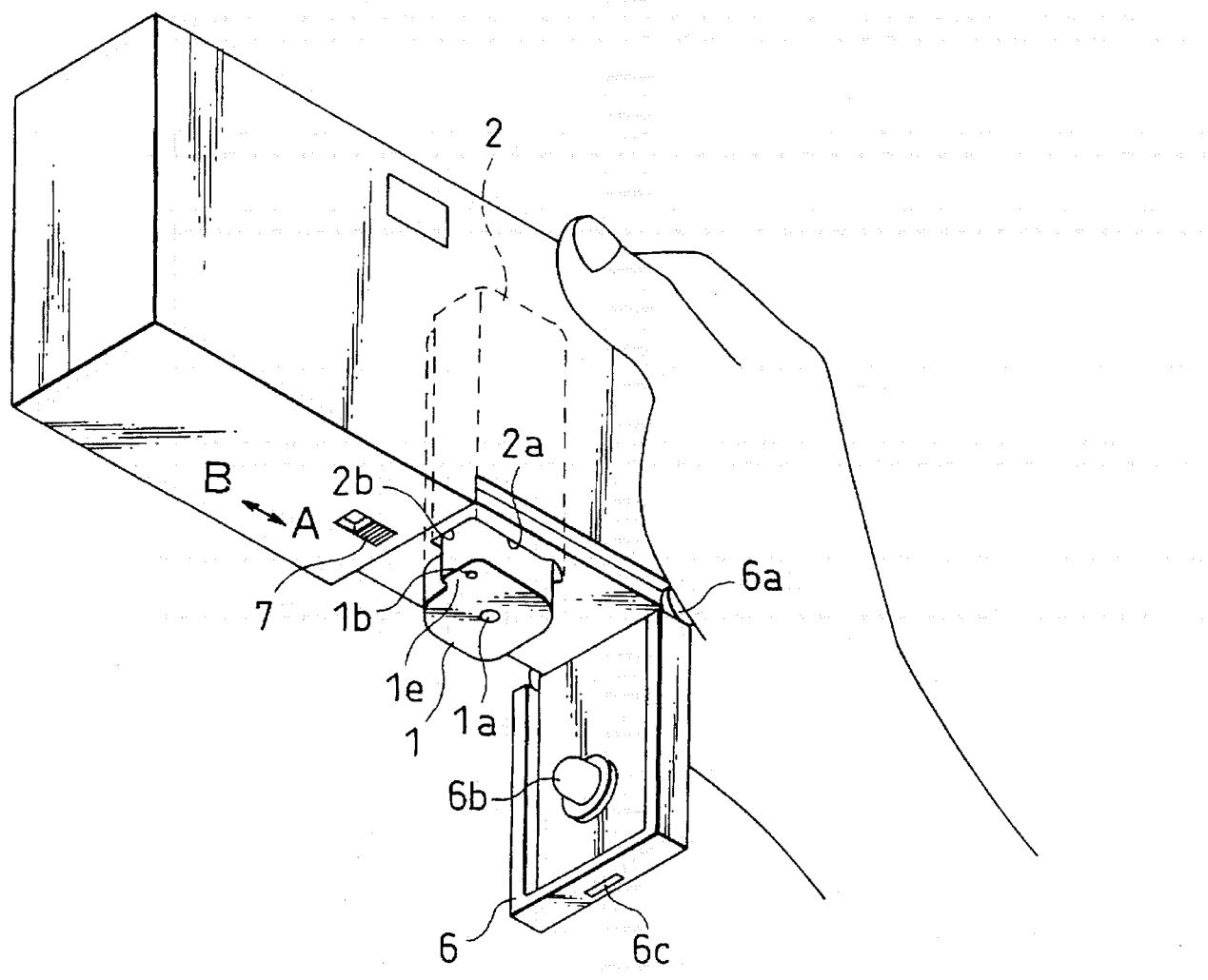
FIG. 1 is a perspective of a camera in the first embodiment according to the present invention.
Figure 2A:
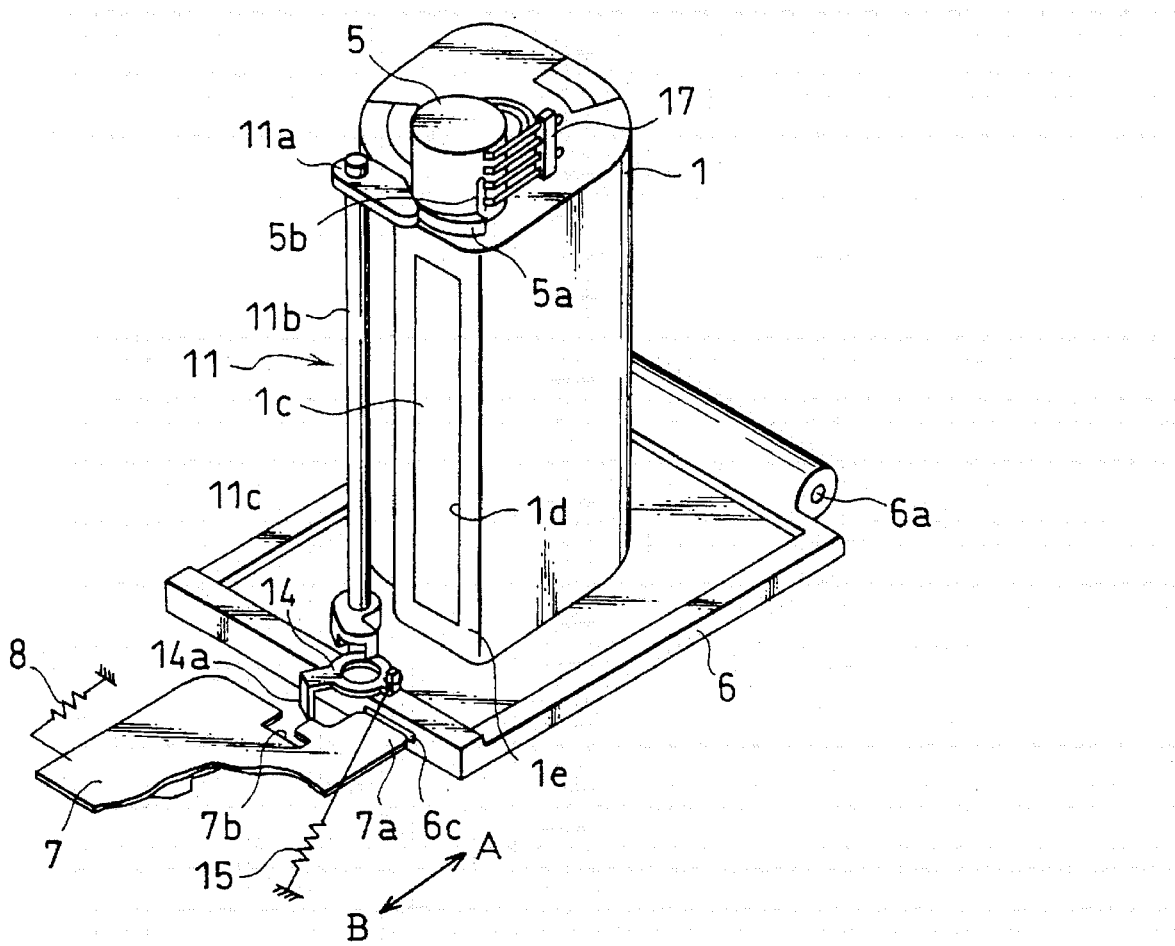
FIG. 2A is a perspective showing a light-blocking door switching mechanism and a cartridge chamber lid locking mechanism of the camera shown in FIG. 1 with the light-blocking door closed.
Figure 2B:
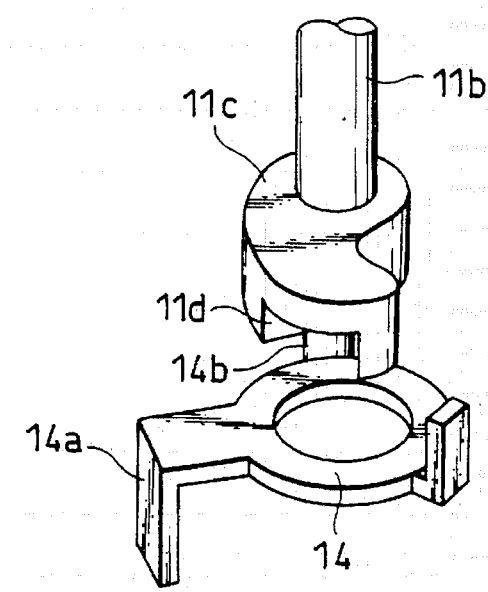
FIG. 2B is a perspective of an essential portion of FIG. 2A.
Figure 3:
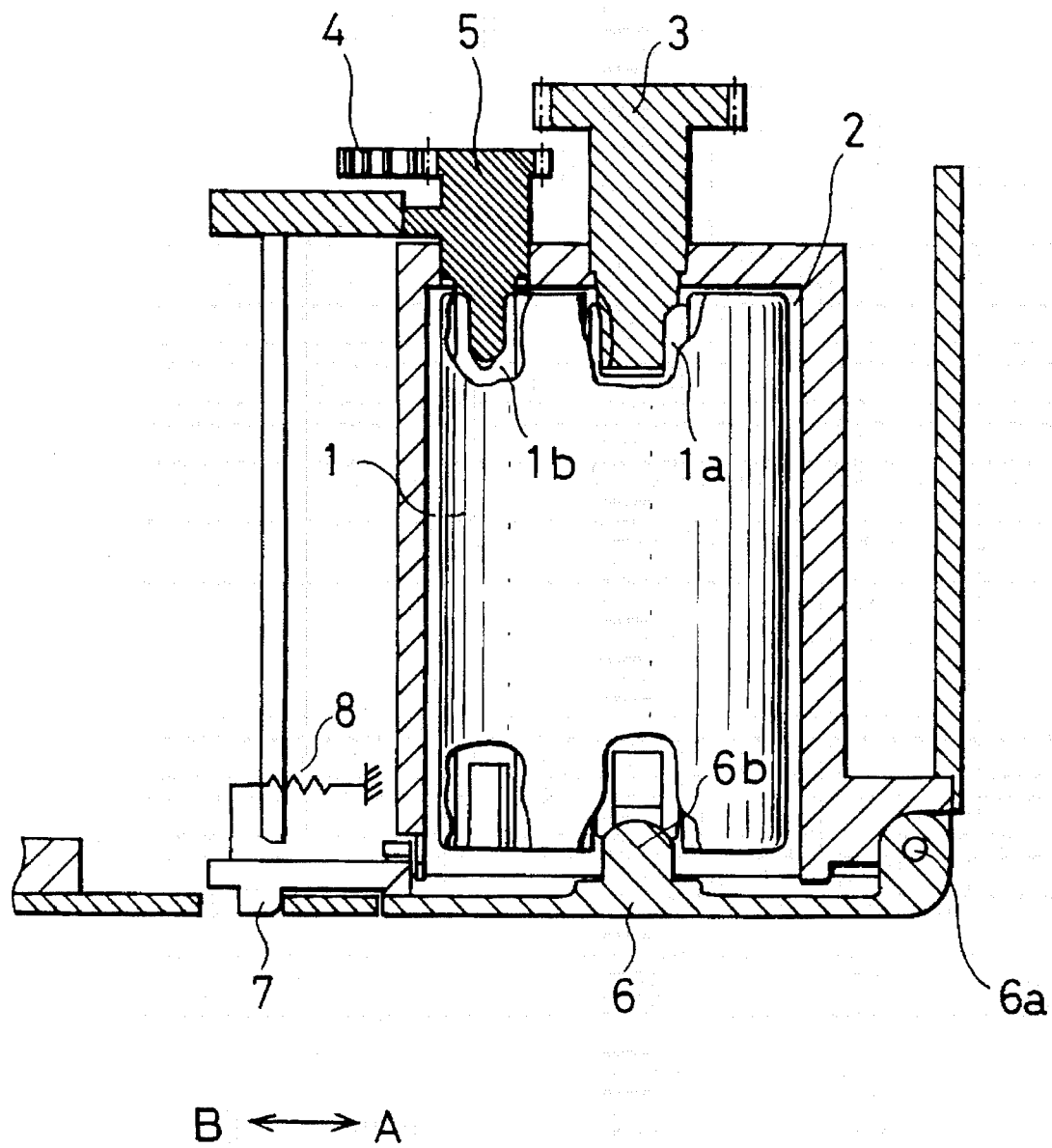
FIG. 3 is a cross section showing a state in which a cartridge is loaded in the cartridge chamber.

In FIGS. 1–3, a film cartridge 1 is provided with a spool shaft 1a on to which film (not shown) is wound, a light-blocking door 1c for opening and closing a film intake and outlet slot 1d and a switching shaft 1b for driving the light-blocking door 1c.

A cartridge chamber 2 where the film cartridge 1 is loaded is provided at one end of the camera, and its opening portion 2a is provided at the bottom surface of the camera. The opening portion 2a may be provided at the upper surface of the camera. The film cartridge 1 is inserted into or removed from the cartridge chamber 2 through the opening portion 2a in a direction running parallel to the spool shaft 1a.

As shown in FIG. 3, when the film cartridge 1 is loaded in the cartridge chamber 2, the film feed fork 3 which is linked with a film feed system (not shown) becomes connected with the spool shaft 1a of the film cartridge 1 and a light-blocking door switching fork 5, which interlocks with a light-blocking door drive device 4 becomes connected with the door switching shaft 1b. The rotation position of the light-blocking door switching fork 5 is detected by a switch pattern 5b provided at the light-blocking door switching fork 5 and a brush mechanism 17.

Reference number 6 indicates a cartridge chamber lid for opening and closing the opening portion 2a of the cartridge chamber 2, which pivots on a rotation shaft 6a extending in a direction perpendicular to the spool shaft 1a. A projected portion 6b which protrudes toward the inside of the cartridge chamber 2 from the cartridge chamber lid 6 clamps the film cartridge 1 between the projected portion 66 and the film feed fork 3, as shown in FIG. 3, to secure the film cartridge 1 at a specific position. Reference number 7 indicates an operating member for opening the cartridge chamber lid 6 and a portion of it is exposed to the outside at the bottom surface of the camera, as shown in FIG. 1. The details of the operating member 7 are to be given later.

In FIG. 2A, and 2B an interlocking member 11 which is provided along the film cartridge 1 comprises a slave member 11a, a rod 11b, one end of which is secured to the slave member 11a and a 11c which is secured to the other end of the rod 11b, and is provided in such a manner that it can rotate around the axis of the rod 11b. The slave member 11a can connect with a cam portion 5a that projects out from the light-blocking door switching fork 5. The rod 11b extends in the vertical direction (parallel to the major axis of the cartridge chamber 2) and its length is approximately the same as the length of the cartridge chamber 2 in the vertical direction. In addition, the rod 11b is constituted of an elastic material and becomes torsionally deformed when a torque at or above a specific value is applied to it.

The operating member 7 described above can be operated to slide in direction A–B in the figures and a force is applied to it in direction A by a spring 8. When a projected portion 7a formed at one end of the operating member 7 is inserted into a connecting slot 6c in the cartridge chamber lid 6, the swinging of the cartridge chamber lid 6 in the opening direction is prevented. A locking portion 14a of a locking member 14 can become engaged with a notch 7b formed in the operating member 7. The locking member 14 is capable of rotating around an axis that is parallel to the rod 11b and a force is applied to it by a spring 15 in the clockwise direction in the figure. The protruding portion 14b formed in the locking member 14 is inserted in a notch 11d of the lever 11c as shown in FIG. 2B.

Figure 4:
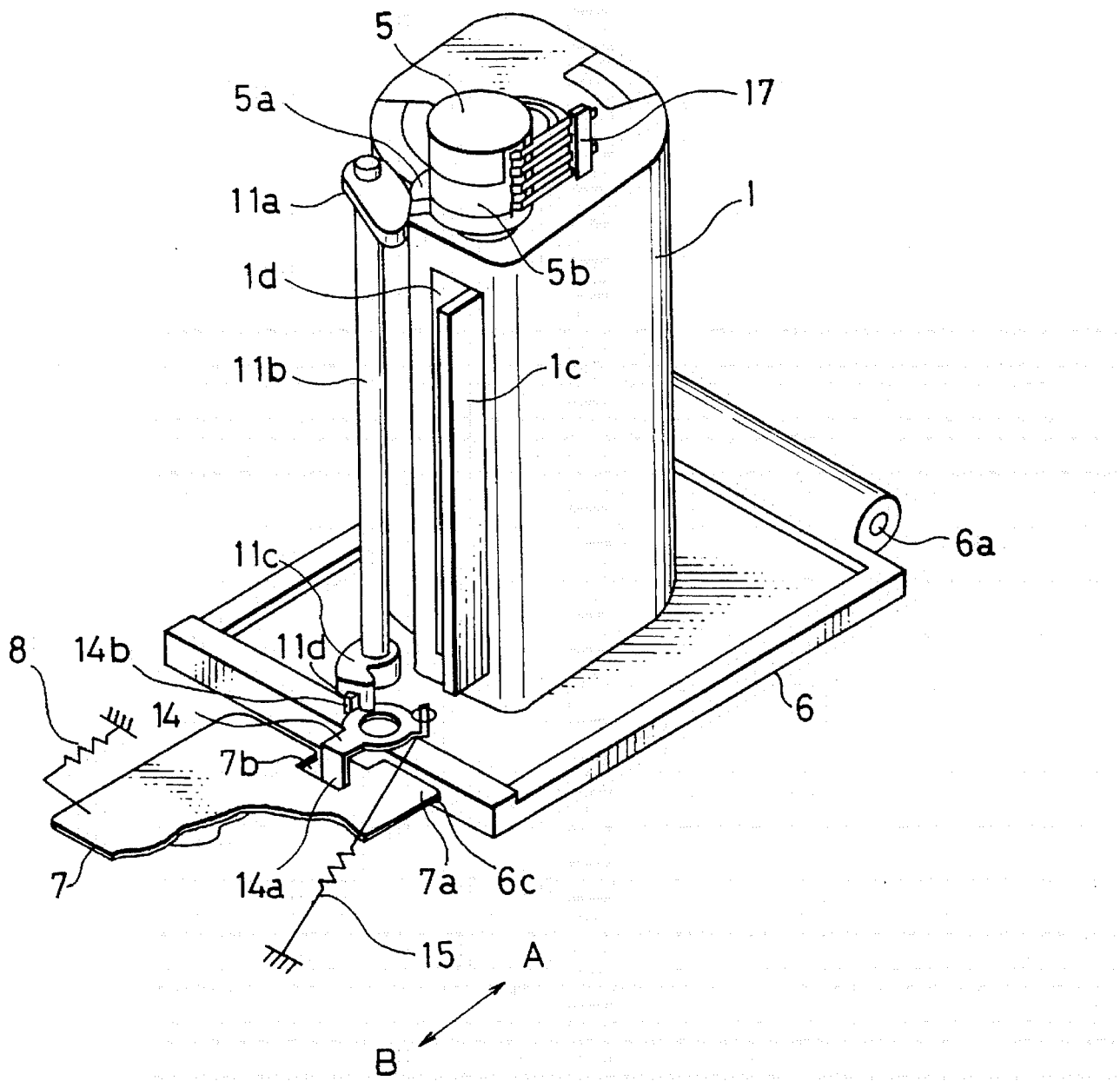
FIG. 4 is similar to FIG. 2A, with the light-blocking door open.

In the camera structured as described above, when the film cartridge 1 is loaded in the cartridge chamber 2, the film feed fork 3 and the light-blocking door switching fork 5 respectively become connected with the spool shaft 1a and the door switching shaft 1b of the film cartridge 1. When the cartridge chamber lid 6 closes, the operating member 7 slides in direction A due to the force applied by the spring 8 and, as shown in FIG. 4, the projected portion 7a becomes inserted through the connecting slot 6c of the cartridge chamber lid 6. As a result, unless the operating member is operated in direction B, the cartridge chamber lid 6 cannot open. At this point, the locking member 14 is still positioned at the position shown in FIG. 2A due to the force applied by the spring 15, and the locking portion 14a is away from the notch 7b of the operating member 7. Consequently, the operating member 7 is free to slide in direction B.

After the cartridge chamber lid 6 is closed, the light-blocking door switching fork 5 is caused to rotate in a specific direction through the operation of the light-blocking door drive device 4 (FIG. 3), and the light-blocking door 1c is opened, as shown in FIG. 4. At this time, the cam portion 5a, which is projected at the light-blocking door switching fork 5, drives the slave portion 11a of the interlocking member 11 to rotate the interlocking member 11 in the clockwise direction. When the interlocking member rotates, the locking member 14 rotates in the counterclockwise direction against the force applied by the spring 15 due to the connection between the notch 11d of the lever 11c and the protruding portion 14b of the locking member 14, and the locking portion 14a of the locking member 14 engages the notch 7b of the operating member 7. This prevents the operating member 7 from sliding in direction B to prohibit opening of the cartridge chamber lid 6.

After this, the film feed fork 3 is driven to rotate the spool shaft 1a of the cartridge 1 and film is delivered through the film intake/outlet slot 1d of the cartridge 1. At this point, since the operating member 7 is prevented from sliding in direction B, the cartridge chamber lid 6 cannot be opened, thereby preventing the film from being inadvertently exposed. When photographing is finished and the entire film is wound back into the cartridge 1, the light-blocking door switching fork 5 is caused to rotate in the direction opposite from the direction mentioned earlier, to close the light-blocking door 1c. Since, by interlocking with this rotation, the cam portion 5a now recedes from the slave portion 11a, the locking member 14 and the interlocking member 11 are caused to rotate in a direction the reverse of that mentioned above due to the force applied by the spring 15 to disengage the locking portion 14a from the notch 7b. Consequently, the operating member 7 is free to move in direction B and it becomes possible to open the cartridge chamber lid 6. At this point the film has already been rewound completely, the light-blocking door 1c has closed and, therefore, even if the cartridge chamber of lid 6 is opened, the film is not inadvertently exposed.

Next, the operation performed when the operating member 7 is slid in direction B immediately after the film cartridge 1 is loaded is explained.

Figure 5:
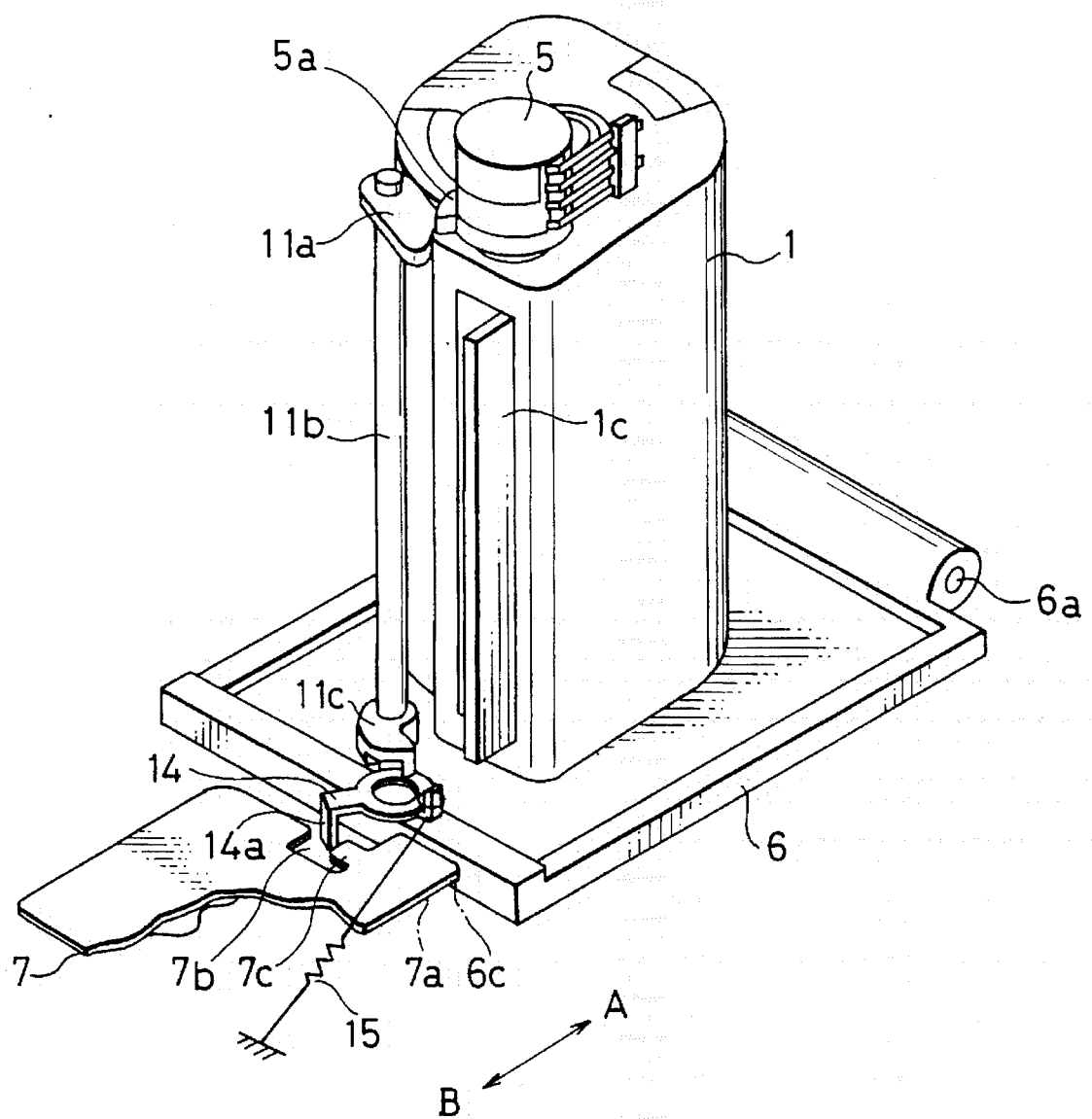
FIG. 5 is similar to FIG. 2A, showing a state in which the rotation of the rod 11b is prevented.

In this case, as in the case described above, with the operation of the light-blocking door drive device 4, the light-blocking door switching fork 5 is caused to rotate in a specific direction and the light-blocking door 1c is driven to an open position. With the clockwise rotation of the interlocking member 11, the locking member 14 rotates in the counterclockwise direction and there is a likelihood of the locking portion 14a coming into contact with the projected portion 7c without becoming engaged with the notch 7b of the operating member 7, as shown in FIG. 5, since the operating member 7 has been caused to move. Since any further rotation of the locking member 14 is prevented in this state, the rotation of the lever 11c, too, is prevented. As a result, the interlocking member 11 receives the rotational force via the cam portion 5a at the upper end in a state in which rotation of the lower end is being prevented, and torsion is applied to the rod 11b.

Since the rod 11b of the interlocking member 11 is constituted of an elastic material, as described above, it becomes torsionally deformed by the torque described above to absorb the rotational force of the light-blocking door switching fork 5. Thus, excessive torque is not communicated to the locking member 14 to prevent the interlocking member 11, the locking member 14 or other members that interlock or come in contact with these members from being deformed or damaged. As has been explained, in this embodiment, deformation of and damage to the members can be prevented without having to add a new part, i.e., without deterring from miniaturization of the camera, by constituting the rod 11b of the interlocking member 11 with a member that can be torsionally deformed.

As illustrated in FIG. 1, in this embodiment the film cartridge 1 is loaded in an attitude in which a projected portion 1e thereof, where the film intake/outlet slot 1d is formed, faces toward the central portion of the camera. Because of this, a notch 2b, which has a shape corresponding to the projected portion 1e is formed in the cartridge chamber 2 toward the center of the camera. In addition, the cartridge chamber lid 6 pivots in the vicinity of a corner portion of the camera, i.e., around the rotation shaft 6a extending on the opposite side from the projected portion 1e. In this structure, since the notch 2b in the cartridge chamber 2 is visible and is not hidden by the cartridge chamber lid 6 when the cartridge chamber lid 6 is open, no error can be made in regard to the direction of the cartridge 1 when loading it. Also, when supporting the camera with the right hand, the cartridge chamber lid 6 swings open in the direction of the hand supporting the camera, facilitating smooth insertion and removal of the cartridge 1 without having to shift the camera to the other hand. Furthermore, since the operating member 7 is provided at a position close to the light-blocking door switching shaft 1b, the mechanism for prohibiting and allowing the movement of the operating member 7 by interlocking with opening and closing of the light-blocking door can be simplified and miniaturized, achieving further miniaturization of the camera.

Moreover, since the rotation shaft 6a is provided on the side opposite from the mechanism for locking the cartridge chamber lid over the cartridge 1, the rotation shaft 6a does not present any hindrance when providing the cartridge chamber lid locking mechanism.

Figure 6:
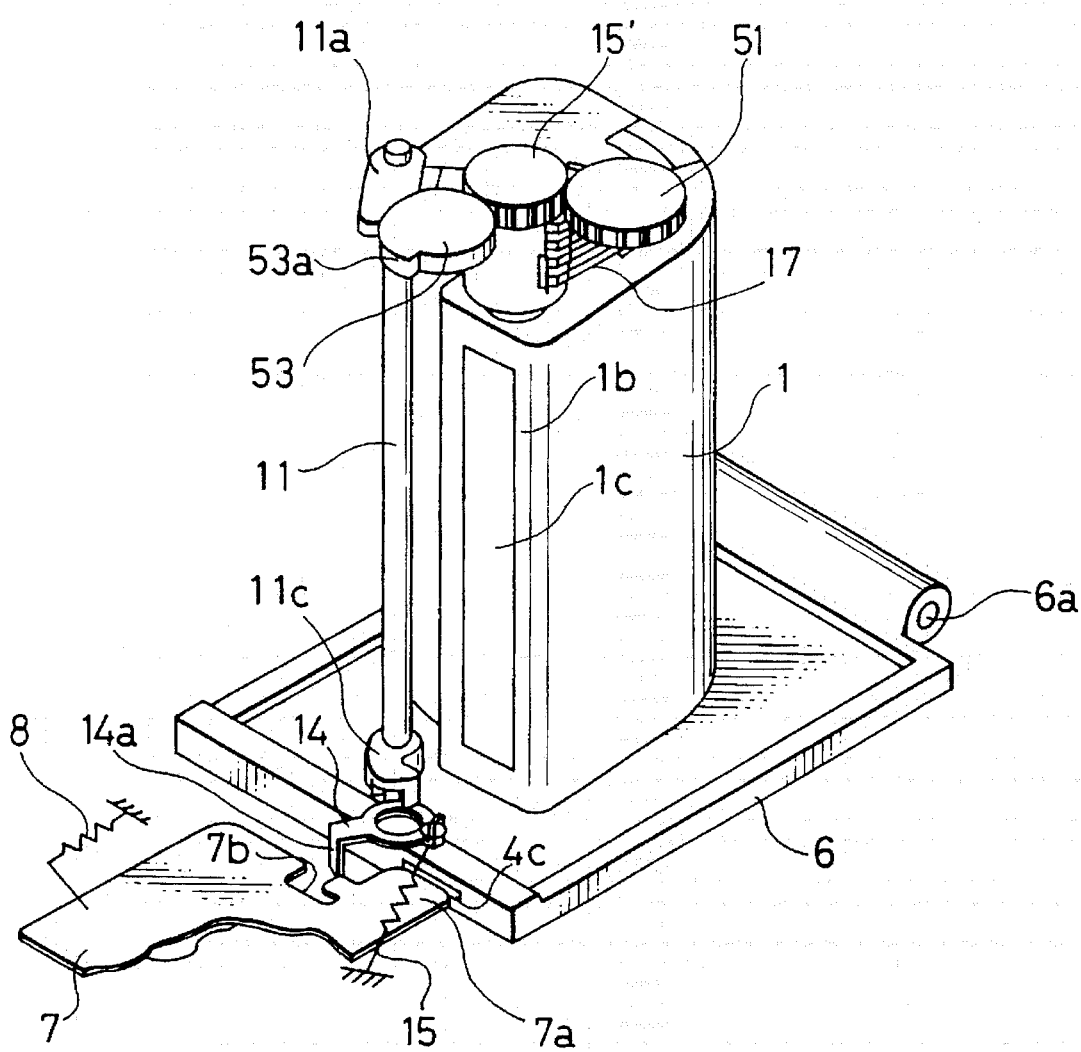
FIG. 6 shows a variation of FIG. 2A.
Figure 7:
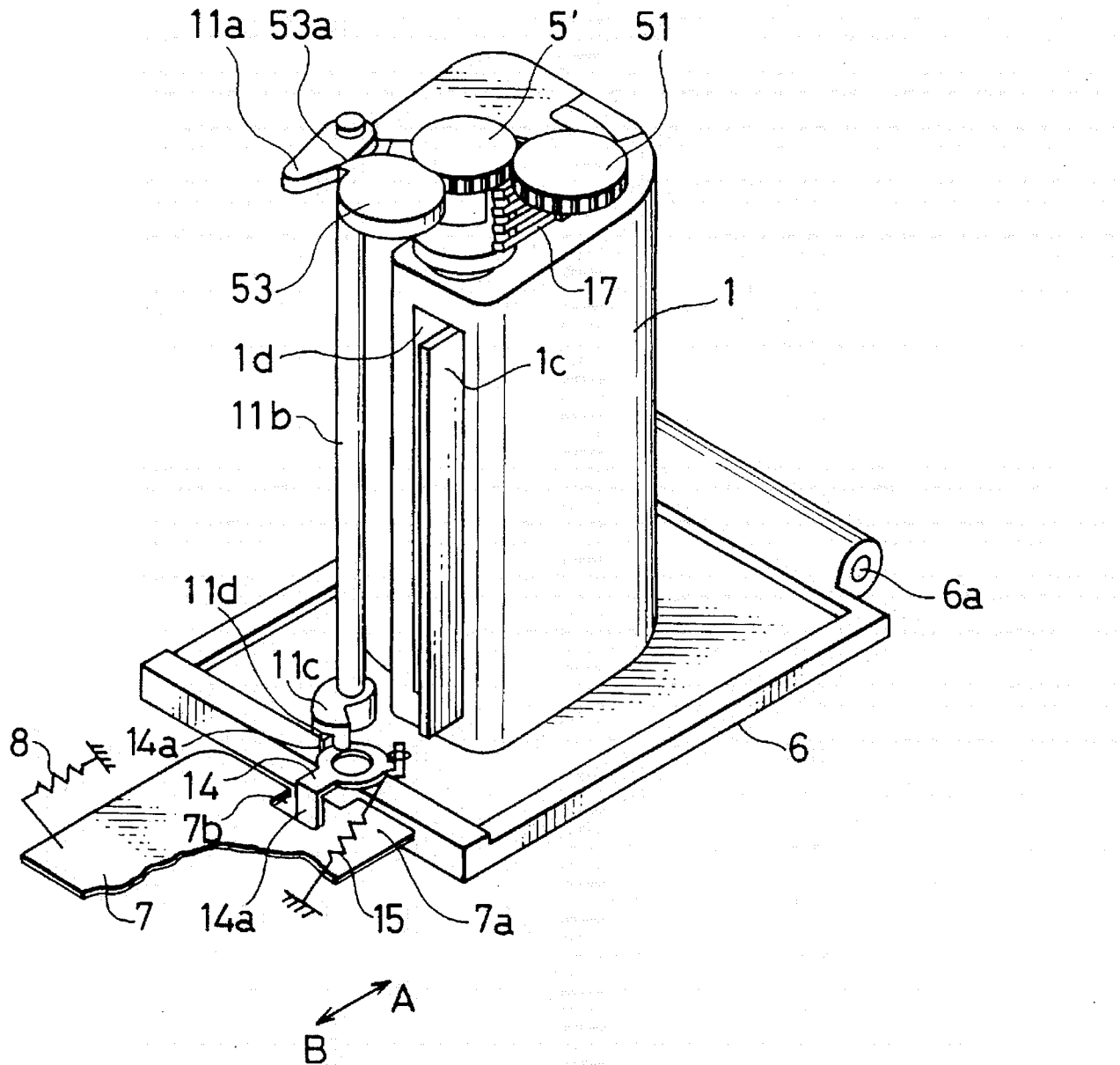
FIG. 7 shows a variation of FIG. 4.

FIGS. 6 and 7 show an embodiment in which part of the structure shown in FIG. 2A and FIG. 4 are changed and the same reference numbers are assigned to members that are identical to those shown in FIGS. 2A and 4.

In FIG. 6, reference number 53 indicates a cam member mounted at a shaft (not shown) in such a manner that it can rotate, and a gear formed on its external circumferential surface interlocks with a gear formed at a light-blocking door switching fork 5'. When the light-blocking door switching fork 5' rotates via a gear 51 in the direction to open the light-blocking door 1c, the cam member 53 rotates so that its cam surface 53a causes the interlocking member 11 to rotate via the slave member 11a. As a result, through an operation similar to that described above, the locking portion 14a of the locking member 14 engages the notch 7b of the operating member 7 (see FIG. 7).

Second Embodiment

Figure 8:
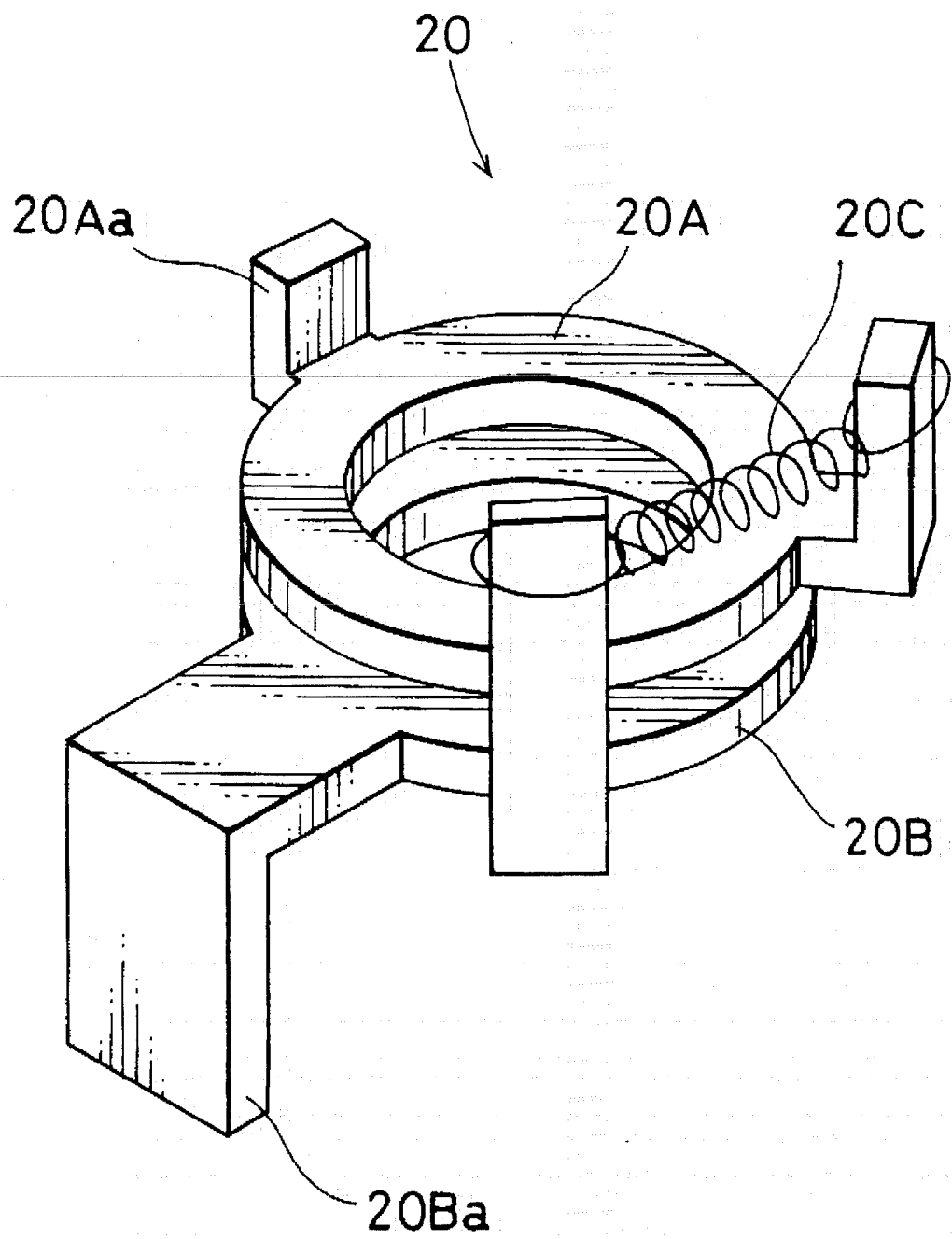
FIG. 8 is a perspective of an essential portion of the second embodiment according to the present invention.

The second embodiment according to the present invention is explained in reference to FIG. 8.

In this embodiment, instead of a member that undergoes elastic deformation, a member 20, as shown in FIG. 8, is employed. This member 20 is used in place of the locking member 14 described earlier, and comprises a member 20A that rotates upon receiving rotational force from the interlocking member 11 at a protruding portion 20Aa, a spring 20C and a member 20B that rotates upon receiving rotational force from the member 20A via the spring 20C. A protruding portion 20Ba is provided projecting at the member 20B, which connects with the operating member 7.

When the light-blocking door 1c is opened, the member 20A is caused to rotate in the counterclockwise direction in the figure by the rotation of the interlocking member 11. This causes the member 20B to rotate in the same direction via the spring 20C and, under normal circumstances, the protruding portion 20Ba engages the notch 7b (FIG. 2A) of the operating member 7 to prevent the operating member 7 from moving in the direction that opens the cartridge chamber lid. If, on the other hand, the protruding portion 20Ba does not engage the notch 7b and the rotation is prevented, only the member 20A rotates against the force applied by the spring 20C. This also prevents excessive force from being applied to the interlocking member 11 and the member 20. Note that in this case it is not necessary to form the interlocking member 11 with an elastic material.

Third Embodiment

Figure 9A:
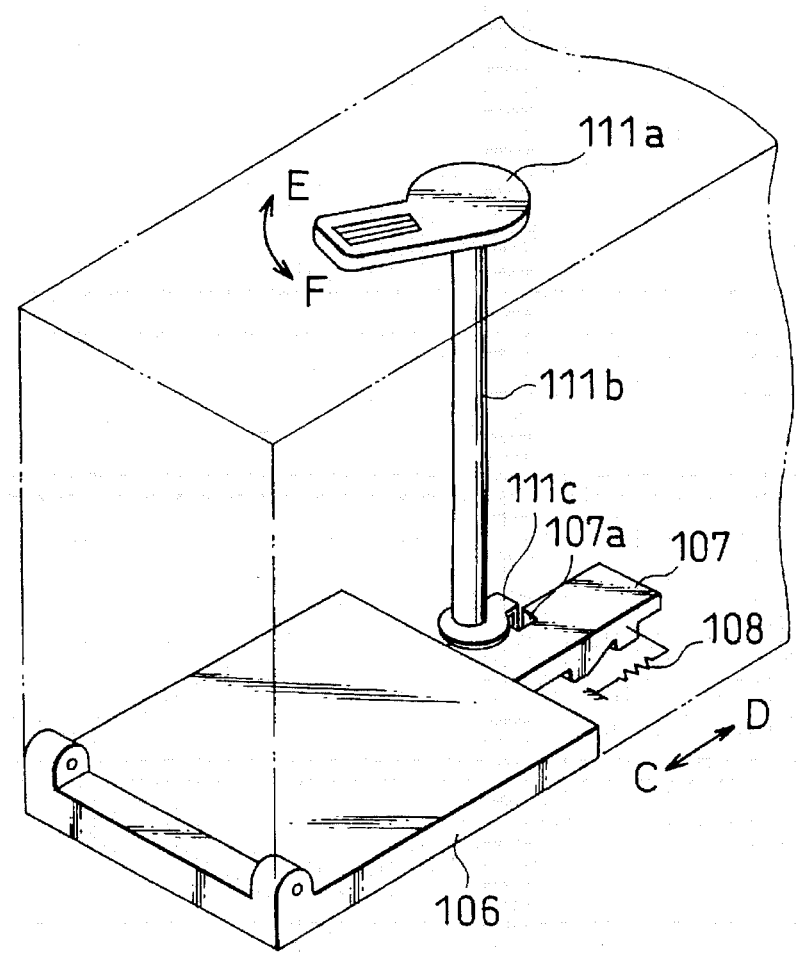
FIG. 9A is a perspective of the locking mechanism in the third embodiment according to the present invention.
Figure 9B:
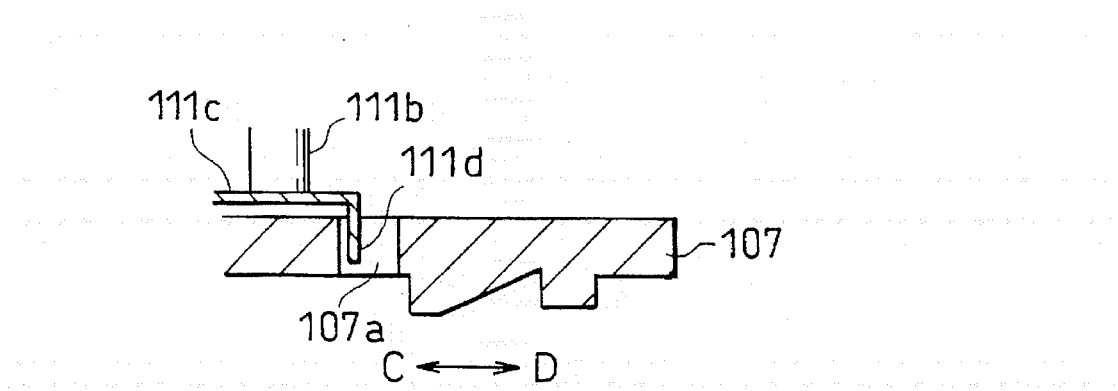
FIG. 9B is a cross section showing an essential portion of FIG. 9A.

A third embodiment according to the present invention is explained in reference to FIGS. 9A and 9B.

In this embodiment, two operating members, i.e., an operating member 107 for opening and closing the cartridge chamber lid and an operating member 111a for locking and unlocking the cartridge chamber lid are provided. The operating member 107 can be operated to slide in direction C and D and a force is applied to it by a spring 108 in direction C. The operating member 111a for locking/unlocking can be operated to turn in direction E and F in FIG. 9A. One end of a rod 111b is secured to the operating member 111a and a lever 111c is mounted at the other end of the rod 111b as an integrated part. The rod 111b extends parallel to the spool shaft 1a of the cartridge 1 and its length is approximately the same as the length of the cartridge chamber 2 in the vertical direction. In addition, the rod 111b is constituted of an elastic material and becomes torsionally deformed when a torque at or above a specific value is applied. As shown in FIG. 9B, a protruding portion 111d of the lever 111c can engage a notch 107a of the operating member 107.

When the cartridge 1 is loaded in the cartridge chamber 2 and a cartridge chamber lid 106 is closed, the operating member 107 moves in direction C due to the force applied by the spring 108 so that a portion of the operating member 107 becomes inserted through a connecting slot of the cartridge chamber lid 106. At this time, unless the operating member 107 is operated in direction D, the cartridge chamber lid 106 cannot open. Then, when the operating member 111a is operated to turn in direction E in the figure, the rod 111b and the lever 111c rotate in unison and the protruding portion 111d of the lever 111c becomes engaged with the notch 107a of the operating member 107. This prevents the operating member 107 from being operated in direction D in the figures and the cartridge chamber lid 6 cannot be opened. In order to open the cartridge chamber lid 106, the operating number 111a should be operated to turn in direction F. This causes the lever 111c to rotate via the rod 111b and its protruding portion 111d withdraws from the notch 107a of the operating number 107. As a result, it becomes possible to operate the operating member 107 in direction D and the cartridge chamber lid 106 may be opened.

If the operating member 111a is caused to rotate in direction E with the movement of the operating member 107 in direction D after the cartridge has been loaded, the lever 111c comes in contact with a side surface of the operating member 107 without becoming inserted in the notch 107a of the operating member 107. This causes a torsional force to be applied to the rod 111b, as in the case described earlier, but since the rod 111b is constituted of an elastic material, the rod 111b becomes torsionally deformed due to the torsional force, to absorb the torque of the light-blocking door switching fork 5. This prevents excessive torque from being communicated to the operating member 107 and the like.

Note that, as shown in FIG. 9B, the lever 111c engages the notch 107a in a state where it projects out from the shaft center of the rod 111b in direction D. Because of this, even if a force is applied to the operating member 107 in direction D while the lever 111c is in the notch 107a, the line of action of the force applied in direction D passes through the shaft center of the rod 111b and, therefore, the rod 111b is not subject to any torque. Consequently, the rod 11b does not turn to cause the lever 111c to withdraw from the notch 107a, and the cartridge chamber lid 106 does not open inadvertently with the operating member 107 sliding in direction D.

I claim:

1. An apparatus capable of being loaded with a film cartridge provided with a light-blocking door for opening and closing a film intake/outlet slot, comprising:

an opening/closing mechanism that opens and closes said light-blocking door;

a cartridge chamber where said film cartridge is housed;

a cartridge chamber lid that opens and closes a cartridge insertion access of said cartridge chamber;

an operating member that is capable of moving between a non-allowing position at which opening of said cartridge chamber lid is prevented and an allowing position at which opening of said cartridge chamber lid is allowed;

a locking mechanism capable of being displaced to a first state in which said operating member is prevented from moving to said allowing position and to a second state in which said operating member is free to move to said allowing position; and an interlocking mechanism that displaces said locking mechanism between said first state and said second state with an operation of said opening/closing mechanism.

2. An apparatus according to claim 1, wherein:

said interlocking mechanism comprises a rotating rod that is capable of rotating upon receiving torque at one end thereof from said opening/closing mechanism, and said locking mechanism comprises a movement preventing member that receives torque from another end of said rotating rod to alternatively prevent and allow movement of said operating member to said allowing position.

3. An apparatus according to claim 2, wherein:

said movement preventing member comprises an engaging portion that is engaged with said operating member upon receiving a drive force from said another end of said rotating rod, to prevent said operating member from moving to said allowing position.

4. An apparatus according to claim 2, wherein:

said rotating rod has substantially the same length as a length of said cartridge chamber in a direction of a major axis thereof and extends in a direction substantially parallel to said direction of said major axis, said rotating rod receiving a torque from said opening/closing mechanism at one end thereof in the vicinity of one end of said film cartridge, transmitting said torque to said locking mechanism at another end thereof in the vicinity of another end of said film cartridge.

5. An apparatus according to claim 4, wherein:

said rotating rod is made of an elastic member which becomes torsionally deformed when a torque above a specific value is applied to said one end while rotation at said another end thereof if prevented.

6. An apparatus according to claim 4, wherein:

said film cartridge has a main body which accommodates a spool shaft, a protruding portion protruded from said main body, at which said film intake/outlet slot is provided, and a hollowing portion provided between said main body and said protruding portion, and said rotating rod is disposed in the vicinity of said hollowing portion.

7. An apparatus provided with a cartridge chamber lid locking mechanism, comprising:

a cartridge chamber where a film cartridge with a light-blocking door is housed;

an opening/closing mechanism that opens and closes said light-blocking door;

a cartridge chamber lid that opens and closes a cartridge insertion access of said cartridge chamber;

an operating member that is capable of moving between a non-allowing position at which opening of said cartridge chamber lid is prevented and an allowing position at which opening of said cartridge chamber is allowed;

a locking mechanism that is capable of becoming displaced to a first position at which said operating member is prevented from moving to said allowing position and to a second position at which said operating member is free to move to said allowing position, and an interlocking mechanism that displaces said locking mechanism between said first position and said second position with an operation of said opening/closing mechanism, said interlocking mechanism comprising a rotating rod which has substantially the same length as a length of said cartridge chamber in a direction of a major axis thereof and extends in a direction substantially parallel to said direction of said major axis, said rotating rod receiving a torque from said opening/closing mechanism at one end thereof in the vicinity of one end of said film cartridge, transmitting said torque to said locking mechanism at another end thereof in the vicinity of the another end of said film cartridge, and wherein:

said rotating rod is made of an elastic member which becomes torsionally deformed when a torque above a specific value is applied to said one end while rotation at said another end thereof is prevented.

8. An apparatus according to claim 7, wherein:

said locking mechanism comprises an engaging portion that is engaged with said operating member upon receiving a drive force from said another end of said rotating rod, to prevent said operating member from moving to said allowing position.

9. An apparatus according to claim 7, further comprising:

a manual operating member operated to apply torque to said rotating rod.

10. An apparatus provided with a cartridge chamber lid locking mechanism, comprising:

a cartridge chamber where a film cartridge is housed;

a cartridge chamber lid that opens and closes a cartridge insertion access of said cartridge chamber;

an operating member that is capable of moving between a non-allowing position at which opening of said cartridge chamber lid is prevented and an allowing position at which opening of said cartridge chamber lid is allowed; and an elastic locking member that is capable of becoming displaced to a first state in which said operating member is prevented from moving to said allowing position and to a second state in which said operating member is free to move to said allowing position, and becomes elastically deformed upon receiving a force in a direction of displacement thereof while said displacement is prevented.

* * * * *